(12) United States Patent
Ma et al.

(10) Patent No.: US 11,644,060 B2
(45) Date of Patent: May 9, 2023

(54) THREADED NUT

(71) Applicant: Xiamen Lota International Co., Ltd., Fujian (CN)

(72) Inventors: Qingshui Ma, Fujian (CN); Huosheng Zhan, Fujian (CN); Dezheng Yu, Fujian (CN); Chuanbao Zhu, Fujian (CN)

(73) Assignee: Xiamen Lota International Co., Ltd., Fujian (CN)

( * ) Notice: Subject to any disclaimer, the term of this patent is extended or adjusted under 35 U.S.C. 154(b) by 215 days.

(21) Appl. No.: 16/745,849

(22) Filed: Jan. 17, 2020

(65) Prior Publication Data
US 2020/0362902 A1 Nov. 19, 2020

(30) Foreign Application Priority Data
May 15, 2019 (CN) .......................... 201910406262.0

(51) Int. Cl.
*F16B 37/08* (2006.01)

(52) U.S. Cl.
CPC ...... *F16B 37/0857* (2013.01); *F16B 37/0864* (2013.01)

(58) Field of Classification Search
CPC .................... F16B 37/0864; F16B 37/0857
USPC .......................................... 411/433, 267, 270
See application file for complete search history.

(56) References Cited

U.S. PATENT DOCUMENTS

| 5,035,528 | A | * | 7/1991 | Thau | F16C 7/00 403/313 |
|---|---|---|---|---|---|
| 5,340,252 | A | * | 8/1994 | Weddendorf | F16B 37/0864 411/433 |
| 5,711,645 | A | * | 1/1998 | Sanbonmatsu | F16B 37/0864 411/270 |
| 5,944,467 | A | * | 8/1999 | Yuta | F16B 37/0842 411/57.1 |
| 6,179,539 | B1 | * | 1/2001 | Benoit | F16B 37/0842 411/278 |
| 6,974,291 | B2 | * | 12/2005 | Li | F16B 37/0864 411/429 |
| 9,222,245 | B2 | * | 12/2015 | Ye | E03C 1/04 |
| 10,724,215 | B2 | * | 7/2020 | Darocha | E03C 1/0401 |
| 2014/0182708 | A1 | * | 7/2014 | Ye | E03C 1/0401 137/315.01 |
| 2020/0362904 | A1 | * | 11/2020 | Ma | F16B 37/0864 |
| 2020/0362905 | A1 | * | 11/2020 | Yu | F16B 39/122 |

* cited by examiner

*Primary Examiner* — Flemming Saether
(74) *Attorney, Agent, or Firm* — Cooper Legal Group, LLC

(57) ABSTRACT

The present disclosure discloses a threaded nut. The threaded nut comprises a body, a plurality of threaded blocks, and a pushing cover. The body comprises a first through hole and a mounting cavity connected to the first through hole. The plurality of threaded blocks is configured to move in the mounting cavity in a radial direction. An inner wall of each of the plurality of threaded blocks is disposed with an internal thread, and an outer wall of each of the plurality of threaded blocks is disposed with a first inclined surface and a first straight surface. The pushing cover is disposed with a second through hole, at least one second straight surface, and at least one second inclined surface.

14 Claims, 13 Drawing Sheets

THREADED NUT

RELATED APPLICATIONS

This application claims priority to Chinese Patent Application 201910406262.0, filed on May 15, 2019. Chinese Patent Application 201910406262.0, is incorporated herein by reference.

FIELD OF THE DISCLOSURE

The present disclosure relates to a threaded nut.

BACKGROUND OF THE DISCLOSURE

At present, existing kitchen faucets are usually installed near the wall and are limited by a shape of a stainless steel sink. A space for locking the existing kitchen faucets under a countertop is very small, and most of the existing kitchen faucets and a sink to which the existing kitchen faucets are coupled are fixed by a screw-in connector. With respect to current locking operations of a threaded nut and a threaded rod, the threaded nut is configured to be rotated from a lower end of the threaded rod. A thickness of the countertop defines an effective length of the threaded rod, which determines the effective length of the threaded nut when it is to be screwed to the threaded rod. The space under the countertop is very small, and therefore an operation space for screwing the threaded nut to the threaded rod is limited. A screwing operation of the threaded nut is therefore time consuming and laborious.

In view of the present situation, quick assembly-disassembly threaded nuts are manufactured. Although the quick assembly-disassembly threaded nuts are configured to achieve fast assembly-disassembly, a pushing cover and a threaded block of the threaded nut are contacted by a first inclined surface and at least one second inclined surface of the threaded nut. If the pushing cover is slightly retracted during an assembly process, the threaded block will move outward, and a clamping force will be lost between the threaded block and a pipe joint of the threaded rod, so the assembly is unreliable or prone to failure.

BRIEF SUMMARY OF THE DISCLOSURE

The present disclosure provides a threaded nut intended to solve deficiencies of the existing techniques. In order to solve the aforementioned technical problems, a technical solution of the present disclosure is as follows.

A threaded nut configured to be coupled to a threaded rod comprises a body, a plurality of threaded blocks, and a pushing cover. The body is disposed with a first through hole and a mounting cavity connected to the first through hole. The plurality of threaded blocks is configured to move in the mounting cavity in a radial direction. An inner wall of each of the plurality of threaded blocks is disposed with an internal thread, and an outer wall of each of the plurality of threaded blocks is disposed with a first inclined surface and a first vertical surface. The pushing cover is disposed on the body and is configured to move in a vertical direction. The pushing cover is disposed with a second through hole corresponding to the first through hole, at least one second vertical surface configured to be coupled to a corresponding one of the first vertical surface, and at least one second inclined surface configured to be coupled to a corresponding one of the first inclined surface. When the threaded nut surrounds an outside of the threaded rod and moves upward in the vertical direction to abut a countertop, the push cover drives the plurality of threaded blocks to move toward a central axis of the threaded rod until the plurality of threaded blocks and the threaded rod are locked due to cooperation of the first inclined surface and a corresponding one of the at least one second inclined surface. When the plurality of threaded blocks and the threaded rod are locked, the first vertical surface couples to an inner side of a corresponding one of the at least one second vertical surface to limit movement of a corresponding one of the plurality of threaded blocks from a radial direction.

In another preferred embodiment, an inner wall of the mounting cavity is disposed with at least one first guiding portion, and the pushing cover is disposed with at least one second guiding portion configured to cooperate with the at least one first guiding portion.

In another preferred embodiment, the at least one first guiding portion is a guiding rib extending from the inner wall of the mounting cavity in a longitudinal direction, and the at least one second guiding portion is a guiding groove or a guiding hole extending in the longitudinal direction.

In another preferred embodiment, a top end of the guiding rib is disposed with an insertion hole, and the pushing cover is disposed with at least one movable cavity. Each of the at least one movable cavity is disposed above a corresponding one of the guiding groove or the guiding hole and is connected to the corresponding one of the guiding groove or the guiding hole. A pin transversely passes through the insertion hole and is configured to be coupled to a surface of a top end of the corresponding one of the guiding groove or the guiding hole.

In another preferred embodiment, the threaded nut comprises a C-ring. The inner wall of each of the plurality of threaded blocks is disposed with a C-ring groove, and the C-ring is disposed in the C-ring groove.

In another preferred embodiment, the threaded nut comprises an elastic reset piece, and two ends of the elastic reset piece respectively abut the pushing cover and the plurality of threaded blocks.

In another preferred embodiment, the push cover is disposed with a locking button facing in a downward direction, and an inner wall of the mounting cavity is disposed with at least one locking groove. The locking button is configured to be engaged with the at least one locking groove, and the locking button is movable in the at least one locking groove.

In another preferred embodiment, the at least one second inclined surface defines a closed annular structure.

In another preferred embodiment, a mounting seat is disposed between the threaded nut and the countertop.

In another preferred embodiment, the mounting cavity is disposed with at least one groove, and the plurality of threaded blocks is disposed with at least one protruding portion configured to slide in the at least one groove. The at least one protruding portion and the at least one groove cooperate with each other to restrict movement of the plurality of threaded blocks to the vertical direction.

Compared with existing techniques, the technical solution of the present disclosure has the following advantages.

When the threaded blocks and the threaded rod (i.e., screw) are tightly engaged, the first vertical surface is fitted on the inner side of the at least one second vertical surface to limit movement of the threaded blocks from a radial direction, thereby avoiding the outward movement of the threaded blocks caused by the looseness of the pushing cover, which results in the threaded blocks losing the tightening force to the threaded rod. Moreover, the locking state of the threaded blocks and the threaded rod can be ensured before the threaded blocks and the threaded rod are unlocked, so that the threaded nut and the threaded rod are more convenient to install.

By the cooperation of the first guiding portion and the second guiding portion, the pushing cover is capable of being guided when moving in a vertical direction.

The pin transversely passes through the insertion hole, and the pin and the top end of the guiding hole are matched and relative movement is limited, so that the pushing cover is capable of moving in the vertical direction along the body while ensuring that the push cover and the body are not separated.

Because the width of the movable cavity is larger than the length of the pin, and the length of the pin is larger than the diameter of the guiding groove or the guiding hole, when the threaded nut is in an unmounted state, the pin abuts the top end of the guiding groove or the guiding hole to ensure that the push cover does not disengage from the body.

BRIEF DESCRIPTION OF THE DRAWING

The present disclosure will be further described below with the combination of the accompanying drawings and the embodiments.

DETAILED DESCRIPTION OF THE EMBODIMENTS

Embodiment 1

Figure 1:
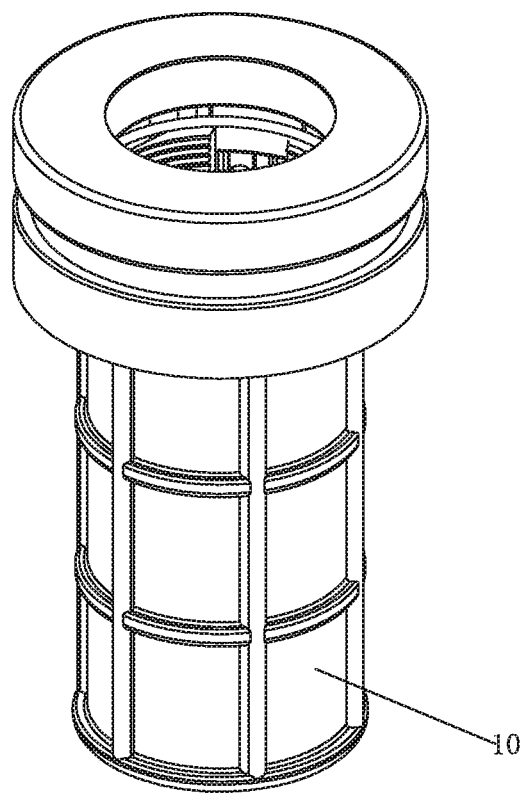
FIG. 1 illustrates a schematic view of a threaded nut of Embodiment 1.

Referring to FIGS. 1-7, in an embodiment of the present disclosure, a rapid assembly threaded nut is configured to be coupled (i.e., threaded or screwed) to a threaded rod 1. The rapid assembly threaded nut comprises a body 10, a plurality of threaded blocks 20, and a pushing cover 30.

The body 10 is disposed with a first through hole 11 and a mounting cavity 12 connected to the first through hole 11.

An inner wall of the mounting cavity 12 is disposed with at least one first guiding portion 100. In this embodiment, each of the at least one first guiding portion 100 is a guiding rib 14 extending from the inner wall of the mounting cavity 12 in a longitudinal direction.

The inner wall of the mounting cavity 12 is disposed with at least one locking groove 15, and a height of each of the at least one locking groove 15 is the same as a movable distance of the pushing cover 30.

The plurality of threaded blocks 20 is configured to move within the mounting cavity 12 in a radial direction. An inner wall of each of the plurality of threaded blocks 20 is disposed with an internal thread 21, and an outer wall of each of the plurality of threaded blocks is disposed with a first inclined surface 22 and a first vertical surface 23 in a vertical direction.

The first inclined surface 22 and the first vertical surface 23 are disposed with a plurality of grooves 24. During an injection molding process of each of the plurality of threaded blocks 20, a wall thickness of each of the plurality of threaded blocks 20 is more uniform, and a size of each of the plurality of threaded blocks 20 is more stable.

Figure 5:
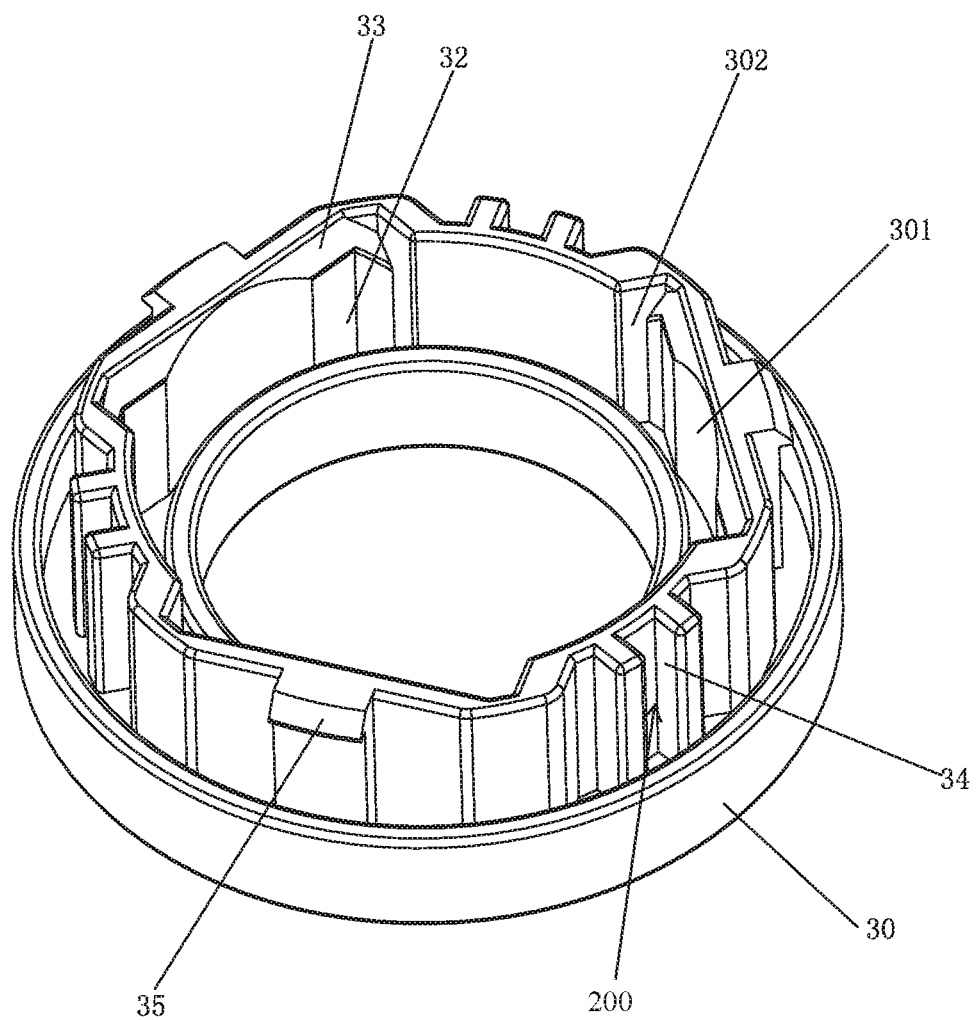
FIG. 5 illustrates a schematic view of a pushing cover of Embodiment 1.

The pushing cover 30 is disposed on the body 10 and is movable in the vertical direction. The pushing cover 30 is disposed with a second through hole 31 corresponding to the first through hole 11, at least one second vertical surface 32 configured to be coupled to the first vertical surface 23, and at least one second inclined surface 33 configured to be coupled to the first inclined surface 22. The at least one second vertical surface 32 and the at least one second inclined surface 33 are disposed in the vertical direction. As shown in FIG. 5, the pushing cover 30 is further disposed with a plurality of first guiding grooves 301 in an amount equal to an amount of the plurality of threaded blocks 20, and each of the plurality of first guiding grooves 301 comprises two positioning surfaces 302 disposed at intervals.

Preferably, the at least one second inclined surface 33 of the pushing cover 30 defines a closed annular structure.

Figure 2:
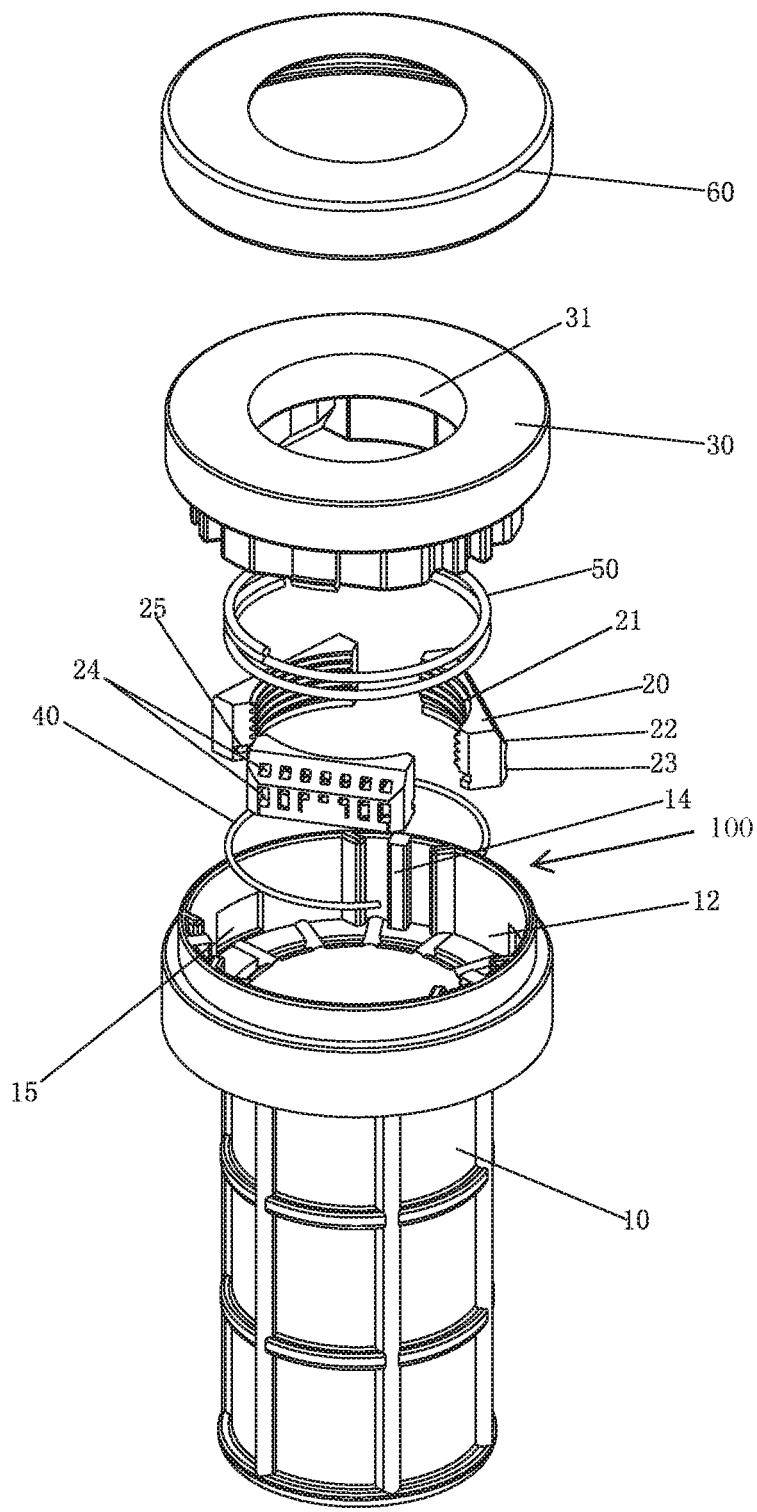
FIG. 2 illustrates an exploded perspective view of the threaded nut of Embodiment 1.
Figure 3:
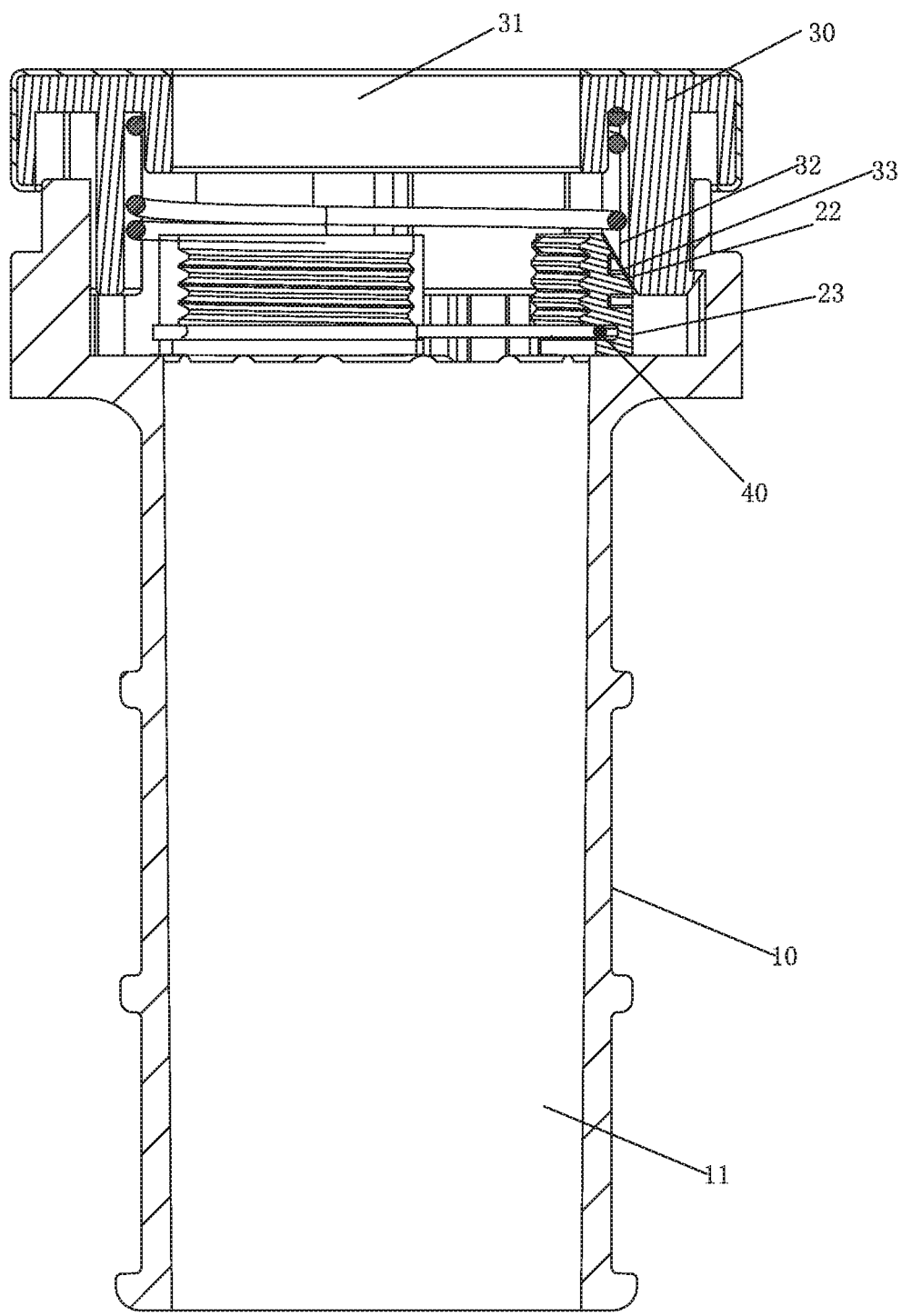
FIG. 3 illustrates a cross-sectional view of the threaded nut of Embodiment 1 when the threaded nut is not locked with the threaded rod.
Figure 4:
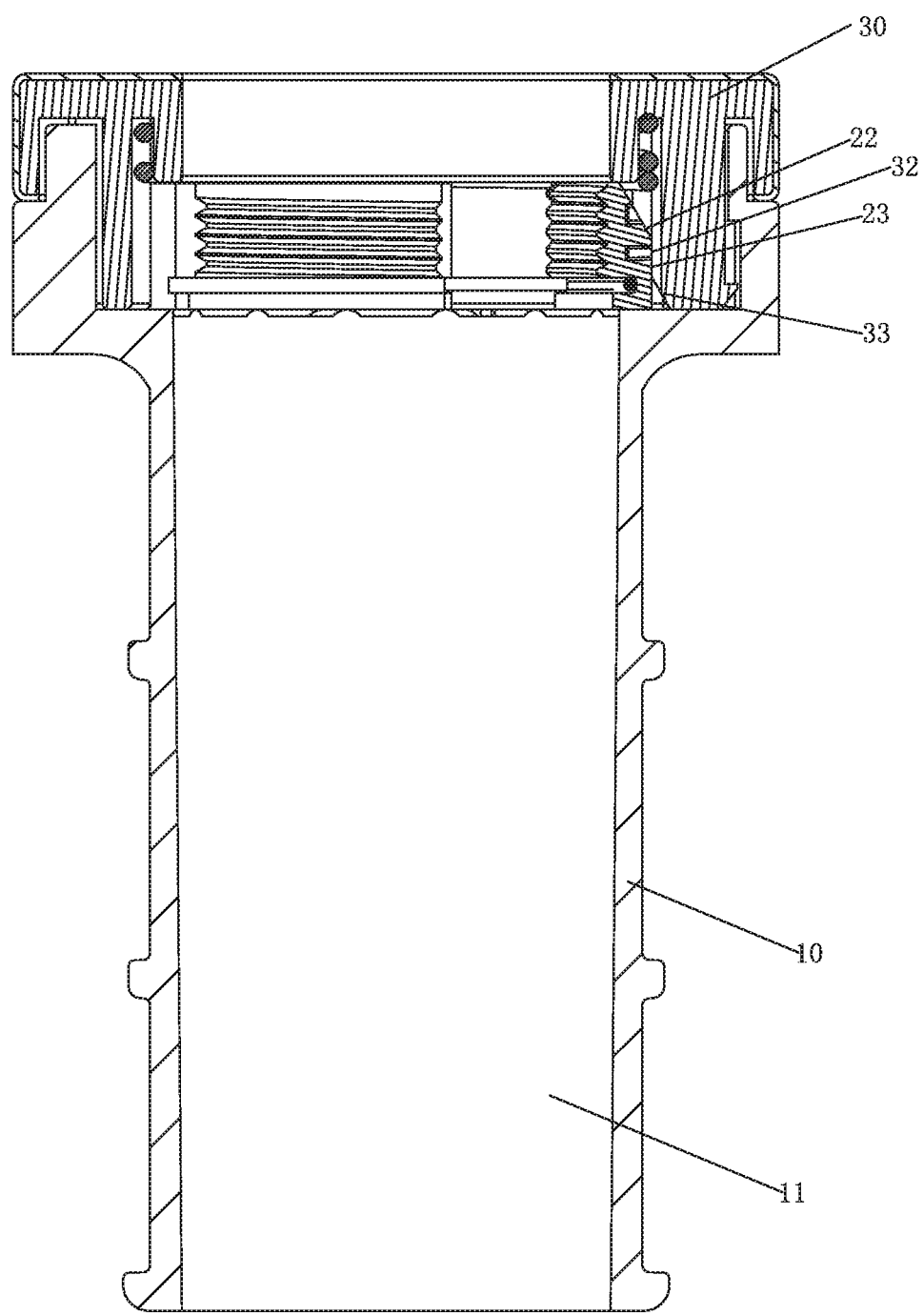
FIG. 4 illustrates a cross-sectional view of the threaded nut of Embodiment 1 when the threaded nut is locked with the threaded rod.

As shown in FIG. 2, two sides of each of the plurality of threaded blocks 20 are vertical surfaces, and two sides of each of the plurality of threaded blocks 20 are respectively matched with the two positioning surfaces 302 of each of the plurality of first guiding grooves 301 to ensure that each of the plurality of threaded blocks 20 can move along a corresponding one of the two positioning surfaces 302 in a radial direction.

When the rapid assembly threaded nut surrounds the threaded rod 1 and moves upward to enable the pushing cover to abut a countertop 2, the pushing cover is always subjected to a downward force due to the pushing cover abutting the countertop, the pushing cover 30 drives the plurality of threaded blocks 20 that are in free states to move towards a central axis of the threaded rod 1 by cooperation of the at least one first inclined surface 22 and the at least one second inclined surface 33 until the inner wall of each of the plurality of threaded blocks 20 and the threaded rod 1 are locked. When the threaded blocks 20 and the threaded rod 1 are locked, the first vertical surface 23 is coupled to an inner side of a corresponding one of the at least one second vertical surface 32 to limit movement of the plurality of threaded blocks 20 in a radial direction due to the downward force from the pushing cover.

The pushing cover 30 is disposed with at least one second guiding portion 200 that is configured to be coupled to the at least one first guiding portion 100.

Each of the at least one second guiding portion 200 is a guiding groove 34 extending in a longitudinal direction.

As shown in FIG. 5, the pushing cover 30 is disposed with at least one locking button 35 facing in a downward direction. The at least one locking button 35 is engaged with the at least one locking groove 15 and is configured to move in the at least one locking groove 15. The at least one locking button 35 cooperates with the at least one locking groove 15 to movably connect the pushing cover 30 to the body 10.

The rapid assembly threaded nut further comprises a ring-shaped element defining at least a partial ring (e.g., a C-ring 40). An inner wall of each of the plurality of threaded blocks 20 is further disposed with a groove (e.g., a C-ring groove 25), and the C-ring 40 is disposed in the C-ring groove 25.

The rapid assembly threaded nut further comprises an elastic reset piece 50 disposed in the pushing cover 30, and two ends of the elastic reset piece respectively abut the pushing cover 30 and the plurality of threaded blocks 20.

The rapid assembling threaded nut further comprises a decorative cover 60 disposed on an outside of the pushing cover 30 to obtain a more beautiful appearance of the pushing cover 30.

Figure 6:
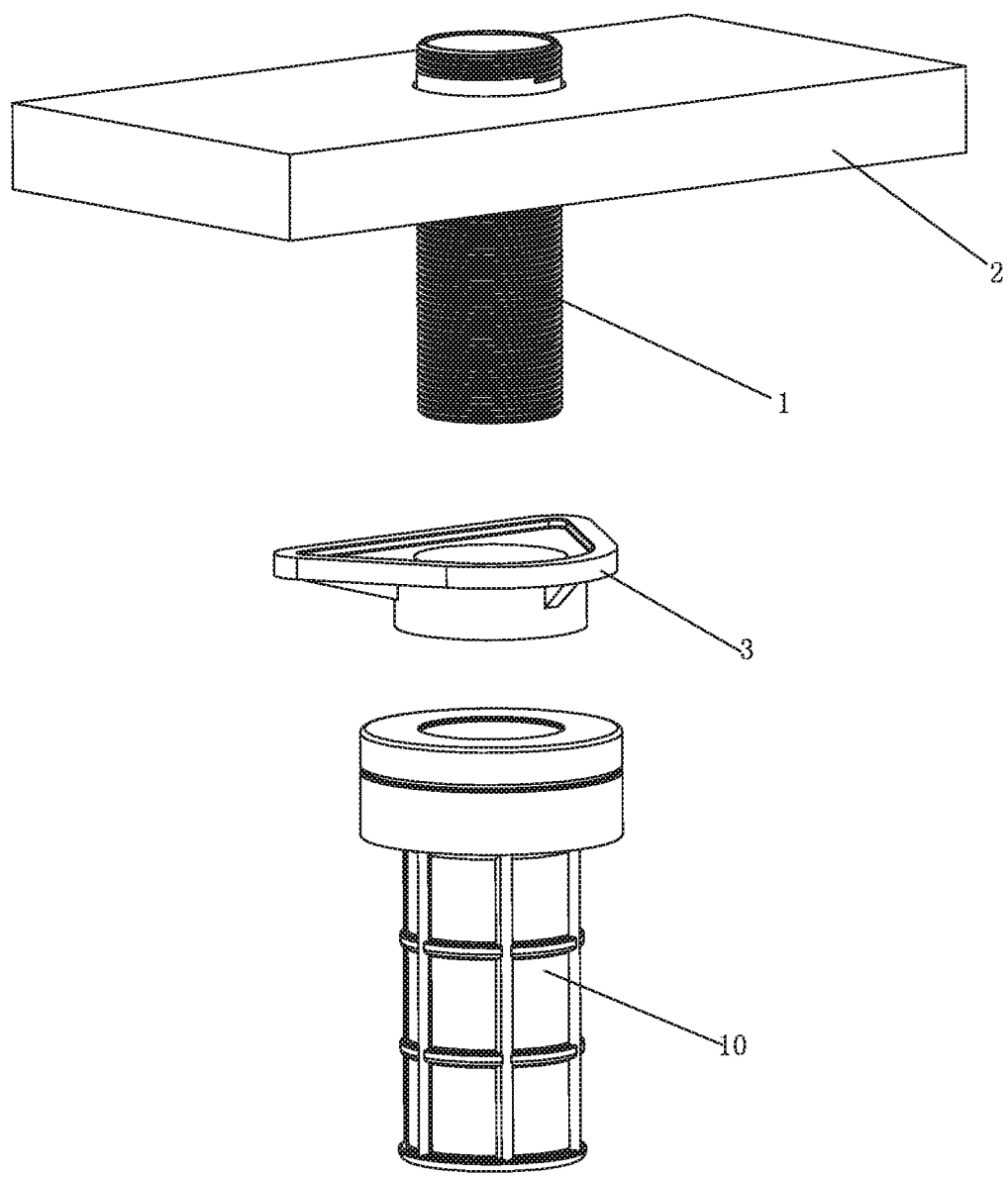
FIG. 6 illustrates as exploded perspective view of the threaded nut and the threaded rod of Embodiment 1 when being assembled.
Figure 7:
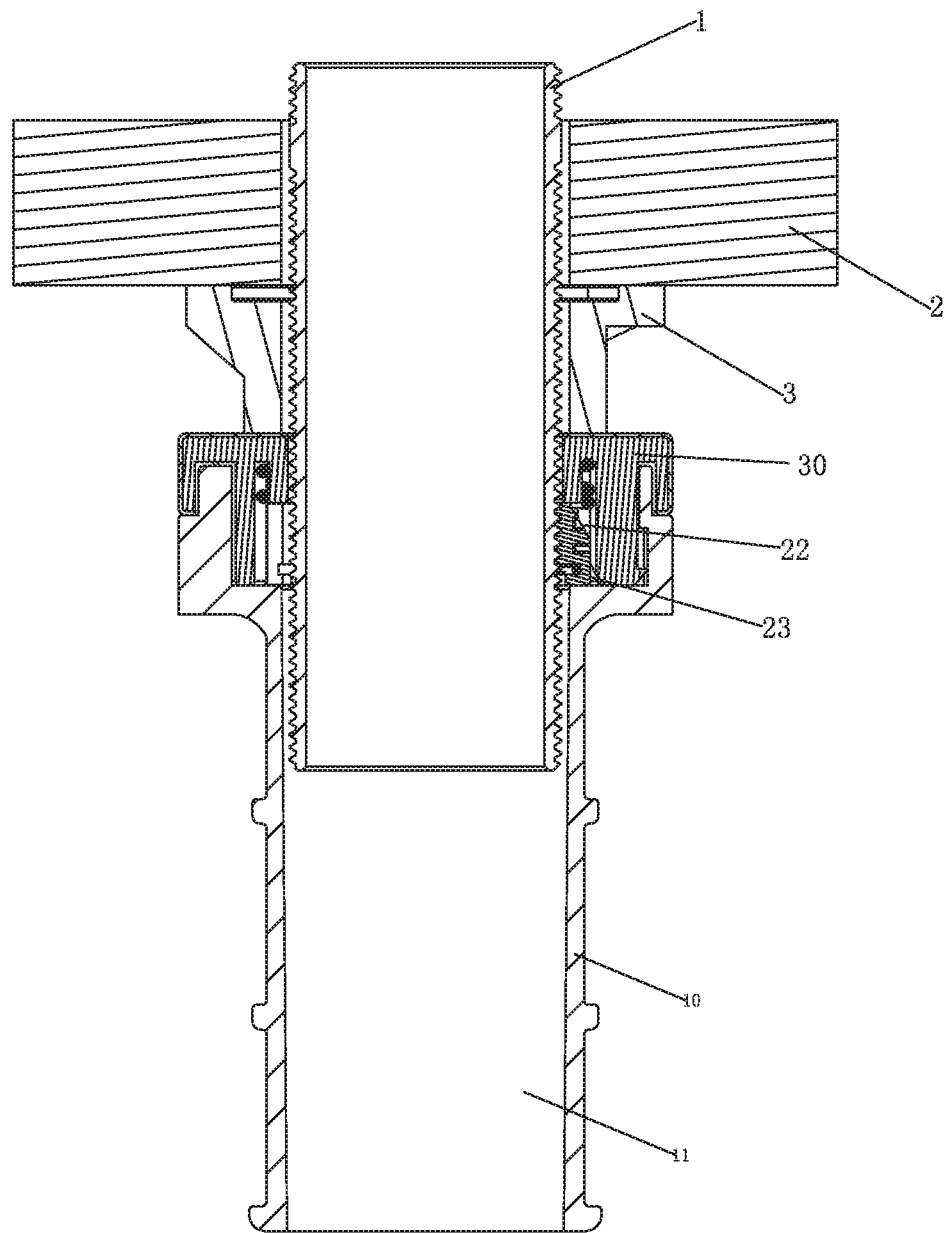
FIG. 7 illustrates a cross-sectional view of the threaded nut and the threaded rod of Embodiment 1 after being assembled.

The installation process of the rapid assembly threaded nut is as follows:

As shown in FIG. 6, the threaded rod 1 is disposed on the countertop 2, and a mounting seat 3 is disposed under the countertop 2. The plurality of threaded blocks 20 comprises three threaded blocks 20.

When the rapid assembly threaded nut is not assembled, the three threaded blocks 20 have a space between each other, and a diameter of internal threads 21 the three threaded blocks 20 is larger than a diameter of the threaded rod 1.

First, aligning the rapid assembly threaded nut with the threaded rod 1, pushing up the rapid assembly threaded nut along the threaded rod 1 until a top surface of the pushing cover 30 abuts a bottom surface of the mounting seat 3, and continuing to push up the rapid assembly threaded nut. With cooperation of the at least one first inclined surface 22 and the at least one second inclined surface 33, the pushing cover 30 drives the three threaded blocks 20 to move towards a central axis of the threaded rod 1 until the three threaded blocks 20 define a uniform diameter equidistant to the central axis of the threaded rod 1 and the three threaded blocks are coupled to the threaded rod 1. At this time, the three threaded blocks 20 are configured to thread with the threaded rod 1 by rotating relative to the threaded rod 1. When top surfaces of the three threaded blocks 20 abut a bottom end of the pushing cover 30, the three threaded blocks 20 and the threaded rod 1 are locked. The at least one first vertical surface 23 is coupled to the inner side of the at least one second vertical surface 32 to limit movement of the three threaded blocks 20 from a radial direction, so that an outward movement of the three threaded blocks 20 caused by a looseness of the pushing cover 30, resulting in a loss of an engagement force with the threaded rod 1 being avoided. A locking state of the threaded blocks 20 and the threaded rod 1 can be ensured, so that an assembly of the rapid assembly threaded nut and the threaded rod 1 is more convenient and more reliable. At this time, the C-ring 40 and the elastic reset piece 50 are in an energy storage state.

When the threaded nut is required to be quickly disassembled, only the rapid assembly threaded nut is rotated, then the three threaded blocks 20 are moved downward by the elastic reset piece 50 to separate the at least one first vertical surface 23 from the at least one second vertical surface 32. The at least one first inclined surface 22 is reset to be contacted by the at least one second inclined surface 33. Under an action of the C-ring 40, the three threaded blocks 20 move outward such that a diameter of the internal threads 21 of the three threaded blocks 20 becomes larger. When the diameter of the internal threads 21 of the three threads blocks 20 is larger than a diameter of an outer side of the threaded rod 1, the rapid assembly threaded nut can be removed from the threaded rod 1 to be quickly disassembled.

Embodiment 2

Referring to FIGS. 8-11, a difference between Embodiment 2 and Embodiment 1 is that an assembly of the pushing cover 30 and the body 10 are different, and the structures of the at least one first guiding portion 100 and the at least one second guiding portion 200 are different.

Figure 8:
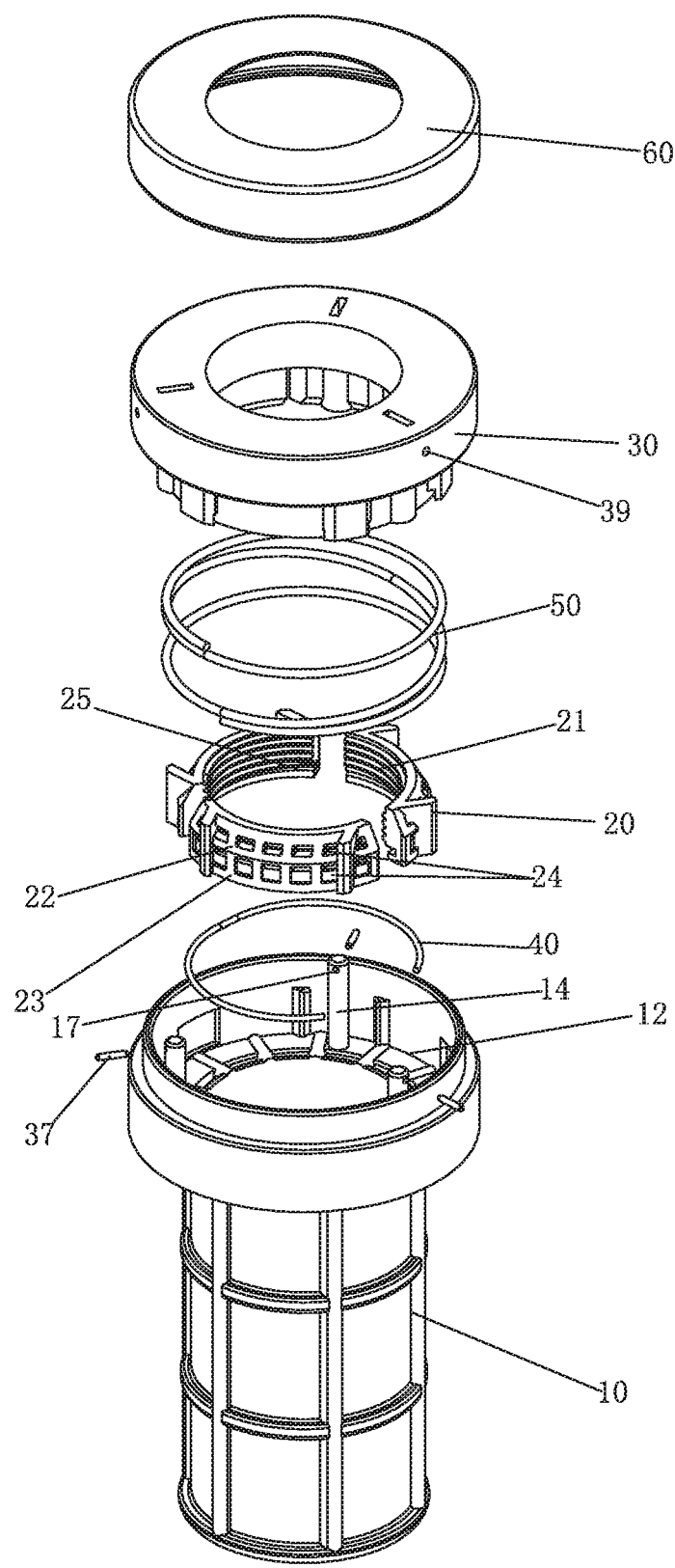
FIG. 8 illustrates an exploded perspective view of a threaded nut of Embodiment 2.

As shown in FIG. 8, each of the at least one first guiding portion 100 is a cylindrical guiding rib 14, and each of the at least one second guiding portion 200 is a cylindrical guiding hole 38. A number of cylindrical guiding holes 38 is three, and the cylindrical guiding holes 38 are spaced away from the at least one second inclined surface 33.

As shown in FIG. 8, a top end of the cylindrical guiding rib 14 is disposed with an insertion hole 17. The pushing cover 30 is disposed with at least one movable cavity 36. Each of the at least one movable cavity 36 is disposed above a corresponding one of the cylindrical guiding hole 38 and is connected to a corresponding one of the cylindrical guiding hole 38. A pin 37 transversely passes through a corresponding one of the insertion hole 17 and is configured to be coupled to a surface of a top end of a corresponding one of the cylindrical guiding hole 38. As shown in FIG. 8, a circumferential surface of the pushing cover 30 is further disposed with at least one through hole 39 connected to a corresponding one of the at least one movable cavity 36 to facilitate the pin 37 being inserted into a corresponding one of the insertion hole 17 from a corresponding one of the at least one through hole 39.

A width of the movable cavity 36 is greater than a length of a corresponding one of the pin 37, and a length of the pin 37 is greater than a diameter a corresponding one of the cylindrical guiding hole 38.

Figure 9:
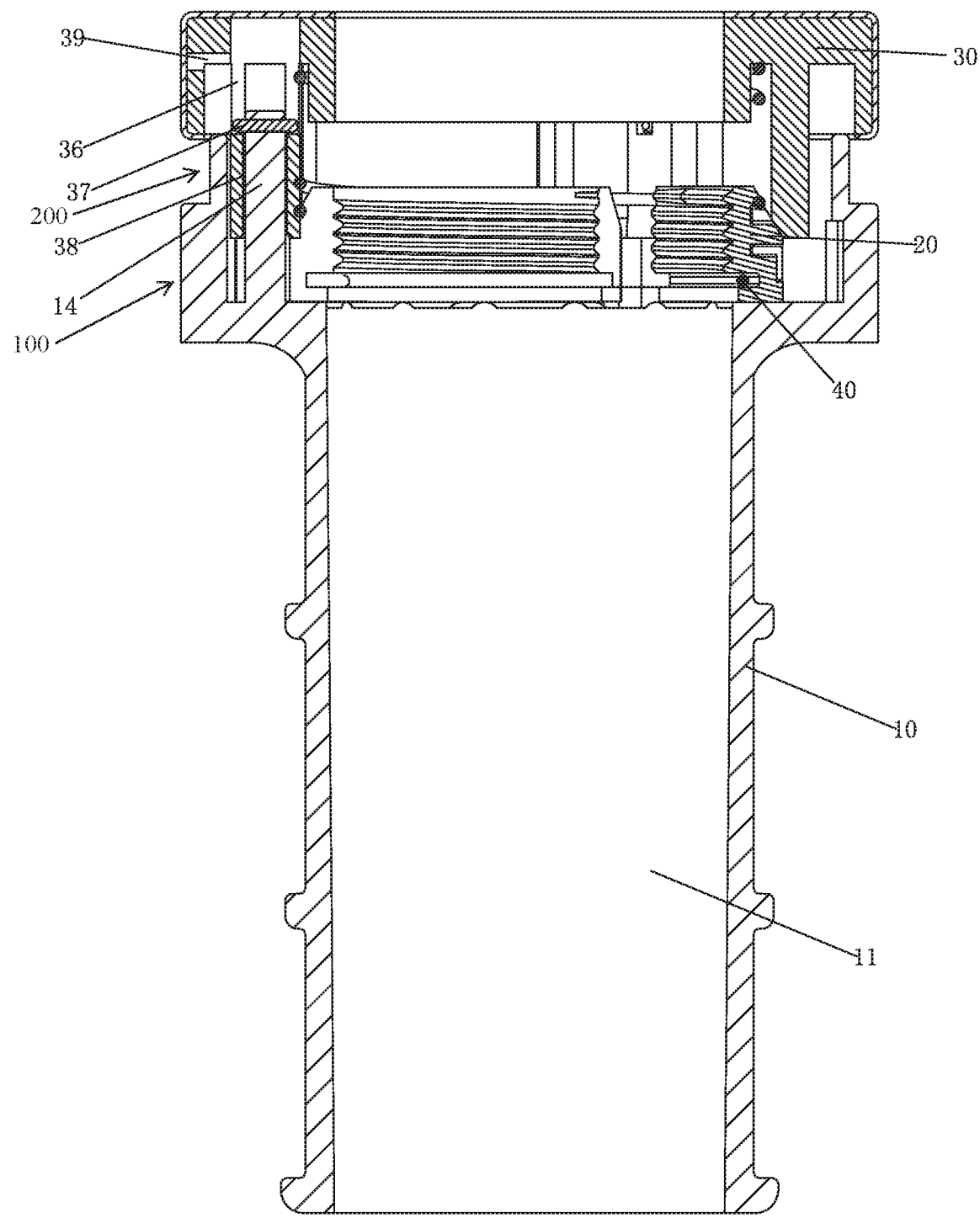
FIG. 9 illustrates a cross-sectional view of the threaded nut of Embodiment 2 when the threaded nut is not locked with the threaded rod.
Figure 10:
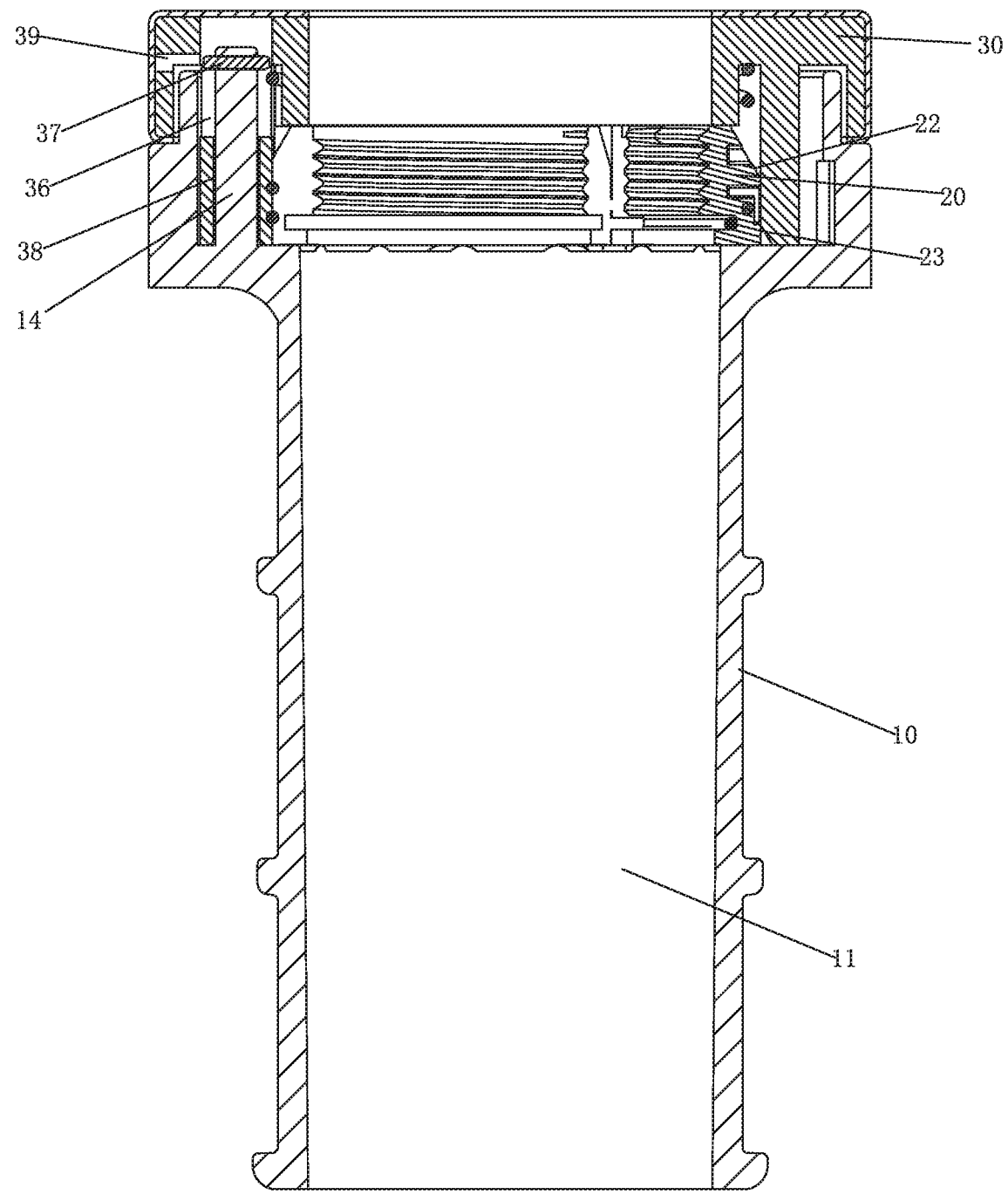
FIG. 10 illustrates a cross-sectional view of the threaded nut of Embodiment 2 when the threaded nut is locked with the threaded rod.
Figure 11:
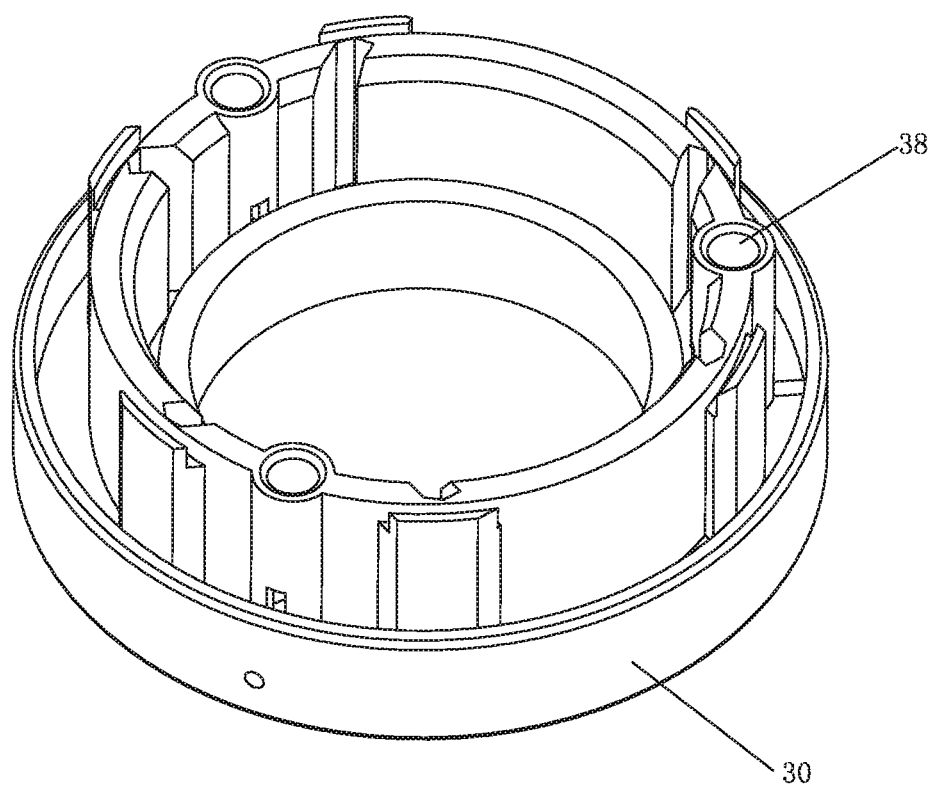
FIG. 11 illustrates a schematic view of a pushing cover of Embodiment 2.

As shown in FIG. 9, before the rapid assembly threaded nut is assembled, the pin 37 abuts the surface of the top end of a corresponding one of the cylindrical guiding hole 38 to ensure that the pushing cover 30 will not separate from the body 10. As shown in FIG. 10, when the rapid assembly threaded nut and the threaded rod 1 are locked, the bottom end of the pushing cover 30 abuts a bottom surface of the mounting cavity 12 to limit a movable distance of the pushing cover 30.

Embodiment 3

Figure 12:
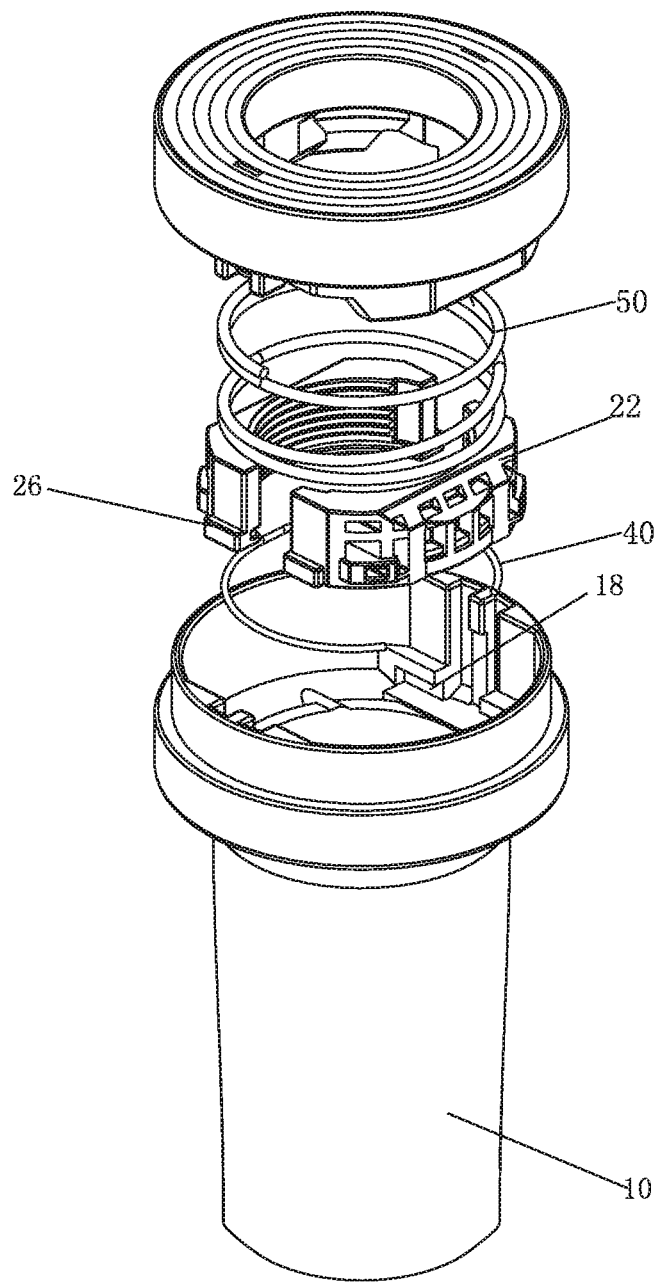
FIG. 12 illustrates an exploded perspective view of a threaded nut of Embodiment 3.
Figure 13:
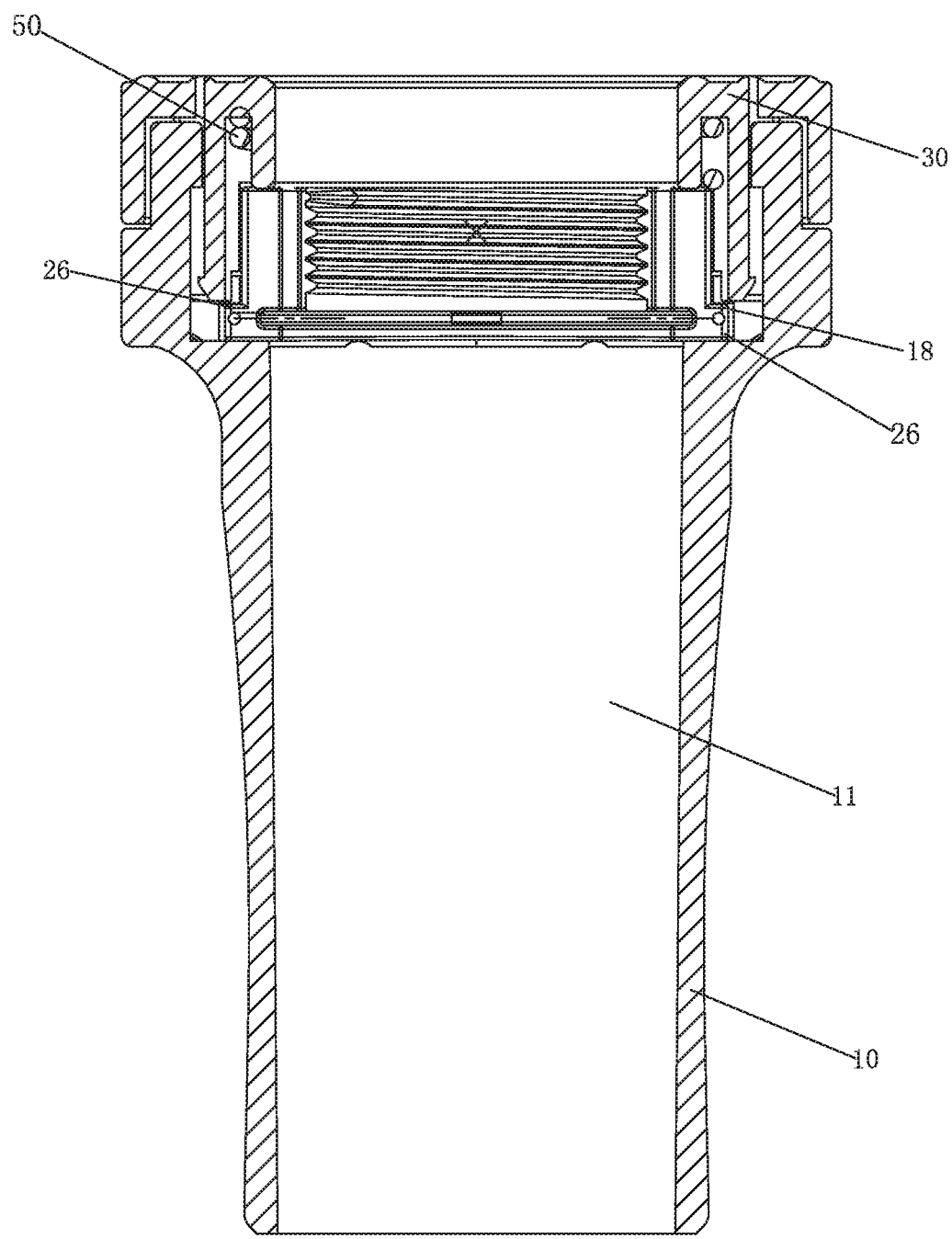
FIG. 13 illustrates a cross-sectional view of the threaded nut and the threaded rod of Embodiment 3 after being assembled.

Referring to FIGS. 12 and 13, a difference between Embodiment 3 and Embodiment 1 is that a positioning structure configured to limit a movement of the plurality of threaded blocks 20 to a radial direction is different. In this embodiment, as shown in FIG. 12, a bottom end of each of two ends of each of the plurality of threaded blocks 20 is disposed with a protrusion 26, and the mounting cavity 12 is disposed with at least one groove set. The number of the at least one groove set is the same as the number of the plurality of threaded blocks 20, and each of the at least one groove set comprises two grooves 18 spaced at intervals. Two protrusions 26 of each of the plurality of threaded blocks 20 are respectively slidably engaged with a corresponding one of the at least one groove group set, and movement of the plurality of threaded blocks 20 is limited to move in the vertical direction by cooperation of protrusions 26 and grooves 18.

It will be apparent to those skilled in the art that various modifications and variation can be made in the present disclosure without departing from the spirit or scope of the invention. Thus, it is intended that the present disclosure cover the modifications and variations of this invention provided they come within the scope of the appended claims and their equivalents.

What is claimed is:

1. A threaded nut configured to be coupled to a threaded rod, comprising:
   a body,
   a plurality of threaded blocks,
   a pushing cover, and
   a ring-shaped element defining at least a partial ring, wherein:
      the body is disposed with a first through hole,
      the plurality of threaded blocks are configured to move in a radial direction,
      at least one inner wall of the plurality of threaded blocks is disposed with at least one internal thread,
      at least one outer wall of the plurality of threaded blocks is disposed with at least one first inclined surface and at least one first vertical surface,
      the pushing cover is disposed on the body and is configured to move in a vertical direction,
      the pushing cover is disposed with a second through hole corresponding to the first through hole, at least one second vertical surface configured to be coupled to the at least one first vertical surface, and at least one second inclined surface configured to be coupled to the at least one first inclined surface,
      the at least one inner wall of the plurality of threaded blocks comprises at least one groove,
      the partial ring is disposed in the at least one groove,
      when the threaded nut surrounds an outside of the threaded rod and moves upward in the vertical direction to enable the pushing cover to abut a countertop:
         the pushing cover is configured to drive the plurality of threaded blocks that are subjected to no external force to be maintained in free states to move toward a central axis of the threaded rod until the at least one inner wall of the plurality of threaded blocks is locked to the threaded rod due to the at least one first inclined surface abutting the at least one second inclined surface,
      when the at least one internal thread and the threaded rod are locked:
         the pushing cover is subjected to a downward force due to the pushing cover abutting the countertop,
         the at least one first vertical surface is configured to couple to an inner side of the at least one second vertical surface to limit movement of the plurality of threaded blocks in the radial direction, and
         the plurality of threaded blocks are subjected to a continuous external force from the countertop to be maintained in forced states in which the plurality of threaded blocks are prone to be reset to the free states, and
      when the continuous external force from the countertop is removed:
         the plurality of threaded blocks are reset to the free states to be separated from the threaded rod.

2. The threaded nut according to claim 1, comprising:
   a mounting cavity, wherein:
      the mounting cavity is connected to the first through hole,
      the plurality of threaded blocks are configured to move in the mounting cavity,
      an inner wall of the mounting cavity is disposed with at least one first guiding portion, and
      the pushing cover is disposed with at least one second guiding portion configured to cooperate with the at least one first guiding portion.

3. The threaded nut according to claim 2, wherein:
   the at least one first guiding portion is a guiding rib extending from the inner wall of the mounting cavity in a longitudinal direction, and
   the at least one second guiding portion is a guiding groove or a guiding hole extending in the longitudinal direction.

4. The threaded nut according to claim 3, wherein:
   a top end of the guiding rib is disposed with an insertion hole,
   the pushing cover is disposed with at least one movable cavity,
   each of the at least one movable cavity is disposed above a corresponding one of the guiding groove or the guiding hole and is connected to the corresponding one of the guiding groove or the guiding hole, and
   a pin transversely passes through the insertion hole and is configured to be coupled to a surface of a top end of the corresponding one of the guiding groove or the guiding hole.

5. The threaded nut according to claim 2, wherein:
   the pushing cover is disposed with at least one locking button facing in a downward direction,
   an inner wall of the mounting cavity is disposed with at least one locking groove,
   the at least one locking button is configured to be engaged with the at least one locking groove, and
   the at least one locking button is movable in the at least one locking groove.

6. The threaded nut according to claim 2, wherein:
   the mounting cavity is disposed with at least one groove,
   the plurality of threaded blocks are disposed with at least one protruding portion configured to slide in the at least one groove, and
   the at least one protruding portion and the at least one groove cooperate with each other to restrict movement of the plurality of threaded blocks in the vertical direction.

7. The threaded nut according to claim 1, wherein:
   the partial ring is a C-ring, wherein:
   the at least one groove is at least one C-ring groove, and
   the C-ring is disposed in the at least one C-ring groove.

8. The threaded nut according to claim 1, comprising:
   an elastic reset piece, wherein:
      two ends of the elastic reset piece respectively abut the pushing cover and the plurality of threaded blocks.

9. The threaded nut according to claim 1, wherein the at least one second inclined surface defines a closed annular structure.

10. The threaded nut according to claim 1, wherein a mounting seat is disposed between the threaded nut and the countertop.

11. The threaded nut according to claim 1, wherein:
when the threaded nut is disassembled:
the threaded nut is configured to be separated from the countertop,
the plurality of threaded blocks are configured to move downward to separate the at least one first vertical surface from the at least one second vertical surface,
the at least one first inclined surface is configured to be reset to be contacted by the at least one second inclined surface, and
the plurality of threaded blocks are configured to be reset to the free states.

12. The threaded nut according to claim 1, wherein the at least one second inclined surface is parallel to the at least one first inclined surface.

13. A threaded nut configured to be coupled to a threaded rod, comprising:
a body,
a plurality of threaded blocks,
a pushing cover, and
a C-ring, wherein:
the body is disposed with a first through hole and a mounting cavity connected to the first through hole,
the plurality of threaded blocks are configured to move in the mounting cavity in a radial direction,
at least one inner wall of the plurality of threaded blocks is disposed with at least one internal thread,
at least one outer wall of the plurality of threaded blocks is disposed with at least one first inclined surface and at least one first vertical surface,
the pushing cover is disposed on the body and is configured to move in a vertical direction,
the pushing cover is disposed with a second through hole corresponding to the first through hole, at least one second vertical surface configured to be coupled to the at least one first vertical surface, and at least one second inclined surface configured to be coupled to the at least one first inclined surface,
the at least one inner wall of the plurality of threaded blocks is disposed with at least one C-ring groove,
the C-ring is disposed in the at least one C-ring groove,
when the threaded nut surrounds an outside of the threaded rod and moves upward in the vertical direction to enable the pushing cover to abut a countertop:
the pushing cover is configured to drive the plurality of threaded blocks that are in free states to move toward a central axis of the threaded rod until the at least one inner wall of the plurality of threaded blocks is locked to the threaded rod due to the at least one first inclined surface abutting the at least one second inclined surface, and
when the plurality of threaded blocks and the threaded rod are locked:
the at least one first vertical surface is configured to couple to an inner side of the at least one second vertical surface to limit movement of the plurality of threaded blocks in the radial direction.

14. A threaded nut configured to be coupled to a threaded rod, comprising:
a body,
a plurality of threaded blocks,
a pushing cover, and
an elastic reset piece, wherein:
the body is disposed with a first through hole and a mounting cavity connected to the first through hole,
the plurality of threaded blocks are configured to move in the mounting cavity in a radial direction,
at least one inner wall of the plurality of threaded blocks is disposed with at least one internal thread,
at least one outer wall of the plurality of threaded blocks is disposed with at least one first inclined surface and at least one first vertical surface,
the pushing cover is disposed on the body and is configured to move in a vertical direction,
the pushing cover is disposed with a second through hole corresponding to the first through hole, at least one second vertical surface configured to be coupled to the at least one first vertical surface, and at least one second inclined surface configured to be coupled to the at least one first inclined surface,
two ends of the elastic reset piece respectively abut the pushing cover and the plurality of threaded blocks,
when the threaded nut surrounds an outside of the threaded rod and moves upward in the vertical direction to enable the pushing cover to abut a countertop:
the pushing cover is configured to drive the plurality of threaded blocks that are in free states to move toward a central axis of the threaded rod until the at least one inner wall of the plurality of threaded blocks is locked to the threaded rod due to the at least one first inclined surface abutting the at least one second inclined surface, and
when the plurality of threaded blocks and the threaded rod are locked:
the at least one first vertical surface is configured to couple to an inner side of the at least one second vertical surface to limit movement of the plurality of threaded blocks in the radial direction.

* * * * *